US012711979B1

(12) United States Patent
Boehlke et al.

(10) Patent No.: US 12,711,979 B1
(45) Date of Patent: Aug. 18, 2026

(54) SYSTEMS AND METHODS FOR MULTI-SPEAKER SPEECH PROCESSING

(71) Applicant: Datavault AI Inc., Philadelphia, PA (US)

(72) Inventors: Kenneth A. Boehlke, Portland, OR (US); Jason R. Abele, Beaverton, OR (US); Mitchell Fantuz, Beaverton, OR (US)

(73) Assignee: Datavault AI Inc., Philadelphia, PA (US)

( * ) Notice: Subject to any disclaimer, the term of this patent is extended or adjusted under 35 U.S.C. 154(b) by 222 days.

(21) Appl. No.: 18/196,798

(22) Filed: May 12, 2023

Related U.S. Application Data

(60) Provisional application No. 63/341,195, filed on May 12, 2022.

(51) Int. Cl.
*G10L 21/055* (2013.01)
*G10L 25/51* (2013.01)

(52) U.S. Cl.
CPC ............ *G10L 21/055* (2013.01); *G10L 25/51* (2013.01)

(58) Field of Classification Search
CPC .............................. G10L 21/055; G10L 25/51
See application file for complete search history.

(56) References Cited

U.S. PATENT DOCUMENTS 5,777,571 A * 7/1998 Chuang ................... G10L 17/00 341/173
9,922,663 B2 * 3/2018 Chen ................... G10L 21/0208
10,819,374 B2 10/2020 Ruano
11,025,600 B1 6/2021 Medard
11,152,011 B2 10/2021 Boehlke
2006/0253282 A1 * 11/2006 Schmidt ............... G07C 5/0808 704/233
2007/0254717 A1 * 11/2007 Yahagi ................... H04B 17/27 455/562.1

(Continued)

OTHER PUBLICATIONS 802.1AS-2011—IEEE Standard for Local and Metropolitan Area Networks—Timing and Synchronization for Time-Sensitive Applications in Bridged Local Area Networks, Mar. 30, 2011. (Year: 2011).*

(Continued)

*Primary Examiner* — Daniel C Washburn
*Assistant Examiner* — Paul J. Mueller
(74) *Attorney, Agent, or Firm* — Greenberg Traurig LLP; Chinh H. Pham; Kristopher Reichlen

(57) ABSTRACT

Systems and methods of the present disclosure enable multi-speaker speech processing by receiving, by a transmitter device, a plurality of voice data signals from a plurality of receiver devices, where each voice data signal of the plurality of voice data signals includes voice data associated with speech, and where the voice data of each voice data signal matches a predefined audio template; modifying, by the transmitter device, each voice data signal to time-align the plurality of voice data signals; combining, by the transmitter device, the plurality of voice data signals into a single voice data signal based at least in part on at least one combining process; and instructing, by the transmitter device, at least one computer process based at least in part on the predefined audio template.

12 Claims, 6 Drawing Sheets

(56) References Cited

U.S. PATENT DOCUMENTS

| | | | | |
|---|---|---|---|---|
| 2015/0170652 | A1* | 6/2015 | Kaplan | G10L 15/22 704/246 |
| 2019/0342358 | A1* | 11/2019 | Barvesten | G10L 15/22 |
| 2020/0028624 | A1 | 1/2020 | Fouli | |

OTHER PUBLICATIONS

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications," Feb. 26, 2021.

"IEEE Standard for a Precision Clock Synchronization Protocol for Networked Measurement and Control Systems," Jun. 16, 2020.

"802.1AS-2011—IEEE Standard for Local and Metropolitan Area Networks—Timing and Synchronization for Time-Sensitive Applications in Bridged Local Area Networks", Mar. 30, 2011.

* cited by examiner

SYSTEMS AND METHODS FOR MULTI-SPEAKER SPEECH PROCESSING

CROSS REFERENCE TO RELATED APPLICATIONS

This application claims priority to U.S. Provisional Application No. 63/341,195 filed on 12 May 2022 and entitled "SYSTEMS AND METHODS FOR MULTI-SPEAKER SPEECH PROCESSING," and is herein incorporated by reference in its entirety.

FIELD OF THE DISCLOSURE

The present disclosure is related generally to the speech processing and, in particular to a system and methods of processing speech received by multi-speakers in a multi-speaker network.

BACKGROUND

Modern multi-speaker audio systems have wireless satellite units which contain both speakers and microphones. The speakers in the satellite units get their audio from a Transmitter source, that is tightly coupled to the television or the internet, via a Forward Link and the microphone data is sent from the Receiver satellite unit to the Transmitter source through the Reverse Link. In some configurations the Transmitter speaker function is located inside the television.

SUMMARY

The present disclosure provides for novel systems and methods of speech processing that alleviate shortcomings in the art, and provide novel mechanisms for multi-speaker speech processing.

In some aspects, the techniques described herein relate to a method including: receiving, by a transmitter device, a plurality of voice data signals from a plurality of receiver devices; wherein each voice data signal of the plurality of voice data signals includes voice data associated with speech; wherein the voice data of each voice data signal matches a predefined audio template; modifying, by the transmitter device, each voice data signal to time-align the plurality of voice data signals; combining, by the transmitter device, the plurality of voice data signals into a single voice data signal based at least in part on at least one combining process; and instructing, by the transmitter device, at least one computer process based at least in part on the predefined audio template.

In some aspects, the techniques described herein relate to a method, wherein the at least one combining process includes at least one of: Equal Weight Combining, Equalize and Equal Weight Combining, Maximum-Ratio Combining (MRC), or Equalize and Maximum-Ratio Combining (MRC).

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
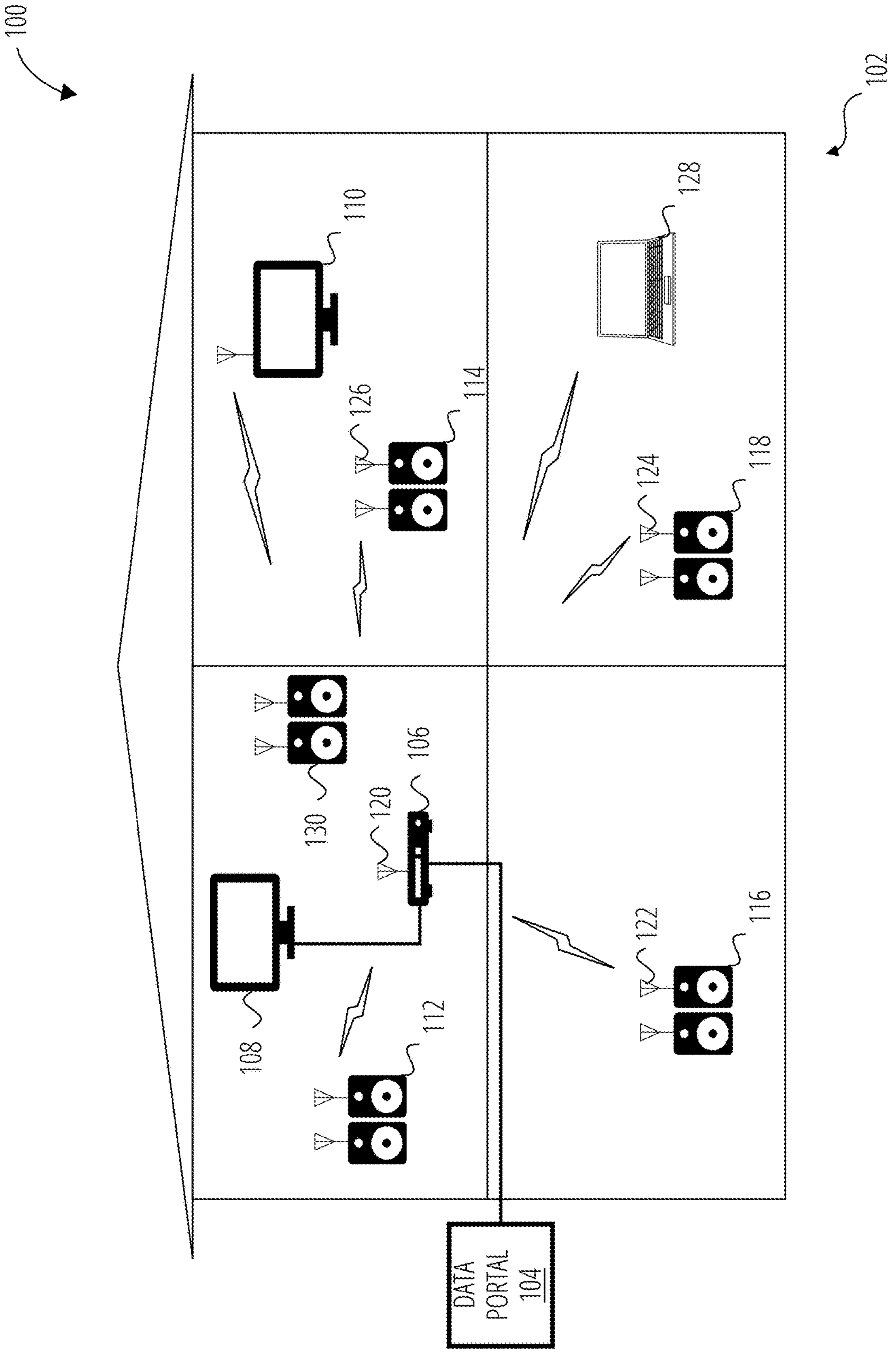
FIG. 1 is a block diagram illustrating non-limiting components of a general environment according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

The detailed description provided herein is not intended as an extensive or detailed discussion of known concepts, and as such, details that are known generally to those of ordinary skill in the relevant art may have been omitted or may be handled in summary fashion.

Certain embodiments will now be described in greater detail with reference to the figures.

Referring now to FIG. 1, FIG. 1 illustrates an environment 100 according to some embodiments of the present disclosure. FIG. 1 shows components of a general environment in which the systems and methods discussed herein may be practiced. Not all the components may be required to practice the disclosure, and variations in the arrangement and type of the components may be made without departing from the spirit or scope of the disclosure.

According to some embodiments, in a building or residence 102 data, including video and audio data, may be retrieved from a storage medium, such as a DVD by a DVD player or from a data portal 104 connected to, for example, a wide area fiber optic network or a satellite receiver, and distributed throughout the residence. For example, in some embodiments, digital video and/or multi-channel audio may be distributed from a source 106 (e.g., DVD player, gaming console, computer, mobile device, and the like) for presentation by displays 108 and 110 and/or speakers 112, 114, 116, 118 through 130, e.g., of surround sound or stereo speaker units, in different rooms of residence 102. In some embodiments, at least part of the distribution network may comprise one or more radio transmitters 120 which may be part of a source 106 and one or more radio receivers 122, 124 through 126 which may be incorporated in the networked devices such as a computer 128, a video display 110, or the speakers 112, 114, 116 through 118 of one or more a stereo or surround sound systems.

As will be noted, in some embodiments, synchronization of the various outputs and minimization of system latency may be essential to high quality audio/video systems. As will be further noted, source-to-output delay or latency ("lip-sync") is important in audio/video systems, such as home theater systems, where a slight difference (e.g, on the order of 50 milliseconds (ms)) between display of a video sequence and the output of the corresponding audio is noticeable. On the other hand, the human ear is even more sensitive to phase delay or channel-to-channel latency between the corresponding outputs of the different channels of multi-channel audio. In some embodiments, channel-to channel latency greater than 1 microsecond (μs) may result in the perception of disjointed or blurry audio.

Audio video bridging (AVB) is the common name of a set of technical standards developed by the Institute of Electrical and Electronics Engineers (IEEE) and providing specifications for time-synchronized, low latency, streaming services over networks. "IEEE 108.1AS-2011—IEEE Standard for Local and Metropolitan Area Networks—Timing and Synchronization for Time-Sensitive Applications in Bridged Local Area Networks" describes a system for synchronizing clocks distributed among the nodes of one or more networks of devices.

According to some embodiments, in an audio video bridging (AVB) network, each network endpoint (e.g., a network node capable of transmitting and/or receiving a data stream) may include two clocks—a "wall" clock and a "media" or "sample" clock. In some embodiments, wall time output by the wall clock may determine the real or actual time of an event's occurrence and/or the real or actual time difference between the initiation of a task and the task's completion. In some embodiments, a sample clock may be an alternating signal which may control the rate at which data is passed to a media processing device for processing. For examples, in an embodiment, in a digital audio system, sample clocks may govern the rate at which an analog signal is sampled and the rate at which digital samples are to be passed to a digital-to-analog converter (DAC) controlling the emission of sound by a speaker.

Figure 2:
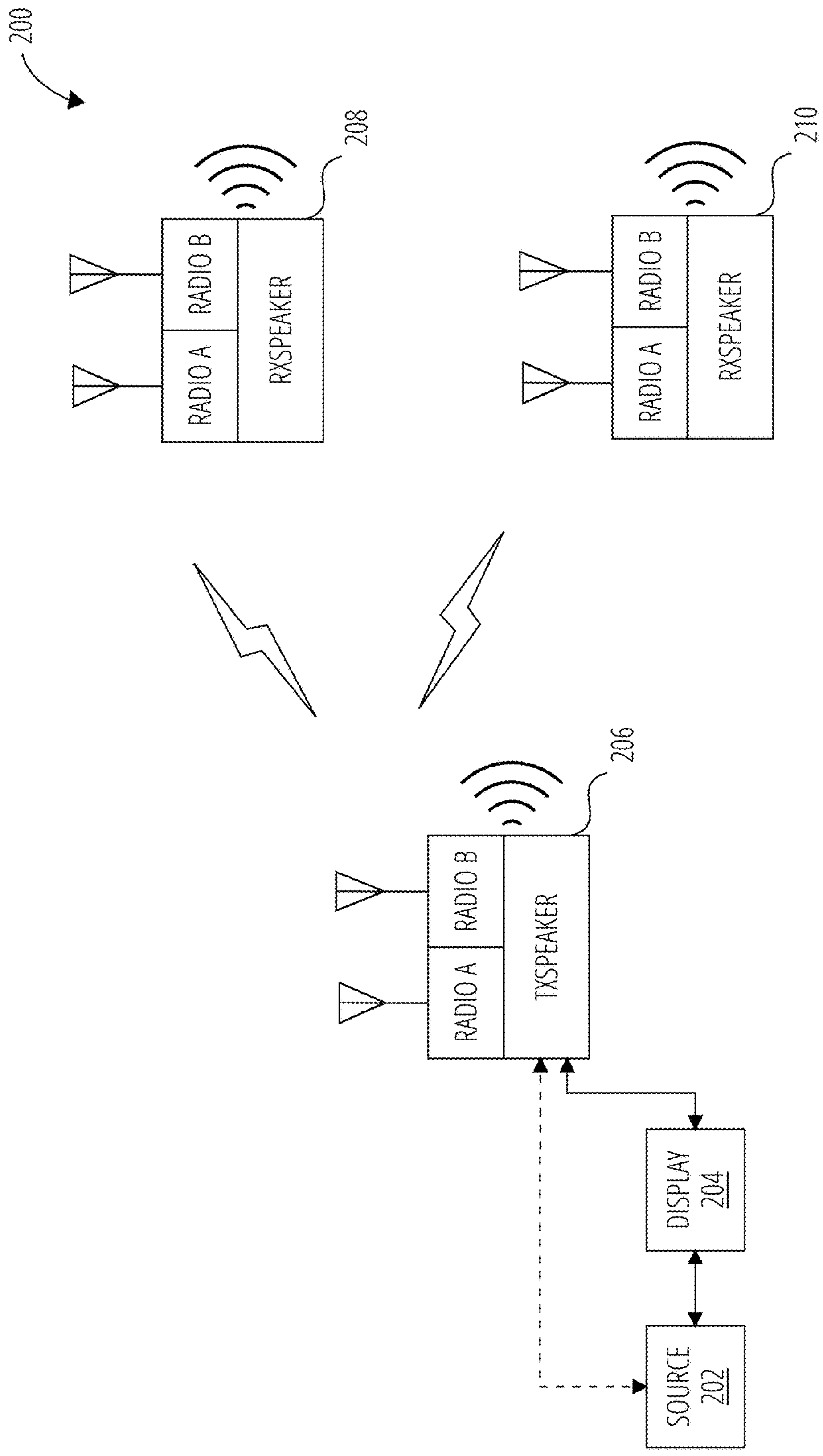
FIG. 2 is a block diagram illustrating components of data transmission network according to some embodiments of the present disclosure.

In general, with reference to FIG. 2, a system 200 in accordance with an embodiment of the present disclosure is shown. FIG. 2 shows components of a general environment in which the systems and methods discussed herein may be practiced. Not all the components may be required to practice the disclosure, and variations in the arrangement and type of the components may be made without departing from the spirit or scope of the disclosure. In some embodiments, different components of system 200 may be combined into a single device.

As shown, system 200 of FIG. 2 may include a data source 202, display 204, a transmitter-speaker (TxSpeaker) 206, and one or more receiver-speakers (e.g., RxSpeakers 208 and 210). In some embodiments, source 202 may be a source of digital audio and/or video. In some embodiments, source 202 may transmit an audio/video stream including a plurality of packets. In some embodiments, source 202 may be a media player, a gaming console, a mobile device, or any other device capable of reproducing and/or transmitting media. In some embodiments, an audio/video stream may be provided to a display 204 for displaying (e.g., a television, a projector, a display monitor) visual media associated with the audio/video stream.

For example, in an embodiment, where the source 202 is a gaming console, source 202 may transmit audio and/or graphics corresponding to gameplay to the display 204. In turn, display 204 may display the graphics. In some embodiments, an audio component of a media stream may be transmitted directly from the source 202 to the TxSpeaker 206. In some embodiments, the media steam may be transmitted from the source 202 to the display 204 and, in turn, the display 204 may transmit audio information corresponding to the media stream to the TxSpeaker 206.

According to some embodiments, TxSpeaker 206 may process the audio information and transmit the processed or transformed audio information to the one or more RxSpeakers (e.g., 208 and RxSpeaker 210).

According to some embodiments, system 200 may be a multi-radio architecture. In some embodiments, data transmitters and receivers of system 200 may utilize one or more radio chains to communicate. For example, in the non-limiting embodiment of FIG. 2, TxSpeaker 206 and RxSpeakers 208 and 210 have two radio chains Radio A and Radio B. In some embodiments, TxSpeaker 206 and RxSpeakers 208 and 210 may have one or more radio chains.

In an embodiment, TxSpeaker 206 and RxSpeakers 208 and 210 may communicate through independent radio chains. For example, in some embodiments, TxSpeaker 206 may communicate with RxSpeakers 208 and 210 through Radio A, Radio B, or both. It will be noted that, in some embodiments, any radio chain of TxSpeaker 206 and RxSpeakers 208 and 210 may communicate with any other radio chain. For example, in some embodiments, TxSpeaker 206 may use Radio A to communicate with Radio B of RxSpeaker 208 while communicating with Radio A of RxSpeaker 210. In some embodiments, any TxSpeaker or RxSpeaker may communicate with any other of TxSpeaker or RxSpeaker using any type of digital communications (including wired and wireless) known or to be known without departing from the scope of the present disclosure.

According to some embodiments, Radio A and Radio B may use Channel A and Channel B, respectively. In some embodiments, Channel A and Channel B may have a channel frequency. In some embodiments, Channel A and Channel B may be separated in channel frequency or band of operation (e.g., Frequency Diversity). In some embodiments, Channel A and Channel B may in the same band but have different bandwidths (e.g., 20/40/80/160 MHz bandwidth in 802.11ac). In some embodiments, Channel A and Channel B may be separated in time (e.g., Temporal Diversity). That is, in some embodiments, data packets may be sent over Channel A and/or Channel B at a different time slots to overcome a burst interference that has interfered with a primary time slot.

According to some embodiments, Channel A and Channel B may be separated in a Modulation Coding Scheme (e.g., Coding Diversity). That is, in some embodiments, data packets may be sent using different physical layer rates of a f a wireless network protocol. For example, in some embodiment, a physical layer rate may be 6 Mbps using Binary Phase-Shift Keying (BPSK) and a coding rate of ½ as disclosed in 802.11a. In some embodiments, a physical layer rate may be 54 Mbps using 64-QAM scheme and a coding rate of 3/4 as disclosed in 802.11a.

According to some embodiments, Channel A and Channel B may have different communication methods (e.g., Broadcast/Multicast v. Unicast). In some embodiments, where the channel communication method is Broadcast/Multicast, data packets may be transmitted to multiple receivers at the same time. In some embodiments, where the channel communication method is unicast, a transmitter may transmit data packets to individual receivers independently. It will be noted that as used herein, any of TxSpeaker 206, RxSpeaker 208, and RxSpeaker 210 may act be a receiver, a transmitter, or both.

According to some embodiments, Channel A and Channel B may have different retransmission methods (e.g., User Datagram Protocol (UDP), Transmission Control Protocol/Internet Protocol (TCP/IP)). In some embodiments, where the retransmission method is UDP, data packets may be sent without acknowledgment. In some embodiments, where the retransmission method is TCP/IP, acknowledgment of packet loss and retransmission of lost packets is supported.

According to some embodiments, Channel A and Channel B may use different radio Physical Layers (e.g., Orthogonal Frequency Domain Multiplexing (OFDM) as disclosed in 802.11a/n/ac, Frequency Hopping Spread Spectrum (FHSS) as disclosed by the Bluetooth standard, and Code Division Multiple Access (CDMA) as disclosed in 802.11b). In some embodiments, different Physical Layers can cover the same frequency band but use different medium access methods and spectral reuse properties. For example, in some embodiments, 802.11g and Bluetooth both share the 2.4 GHz Band, however, 802.11g may move from one 20 MHz Channel to another while Bluetooth dynamically may hop over an entire 80 MHz band in one packet period.

Figure 3:
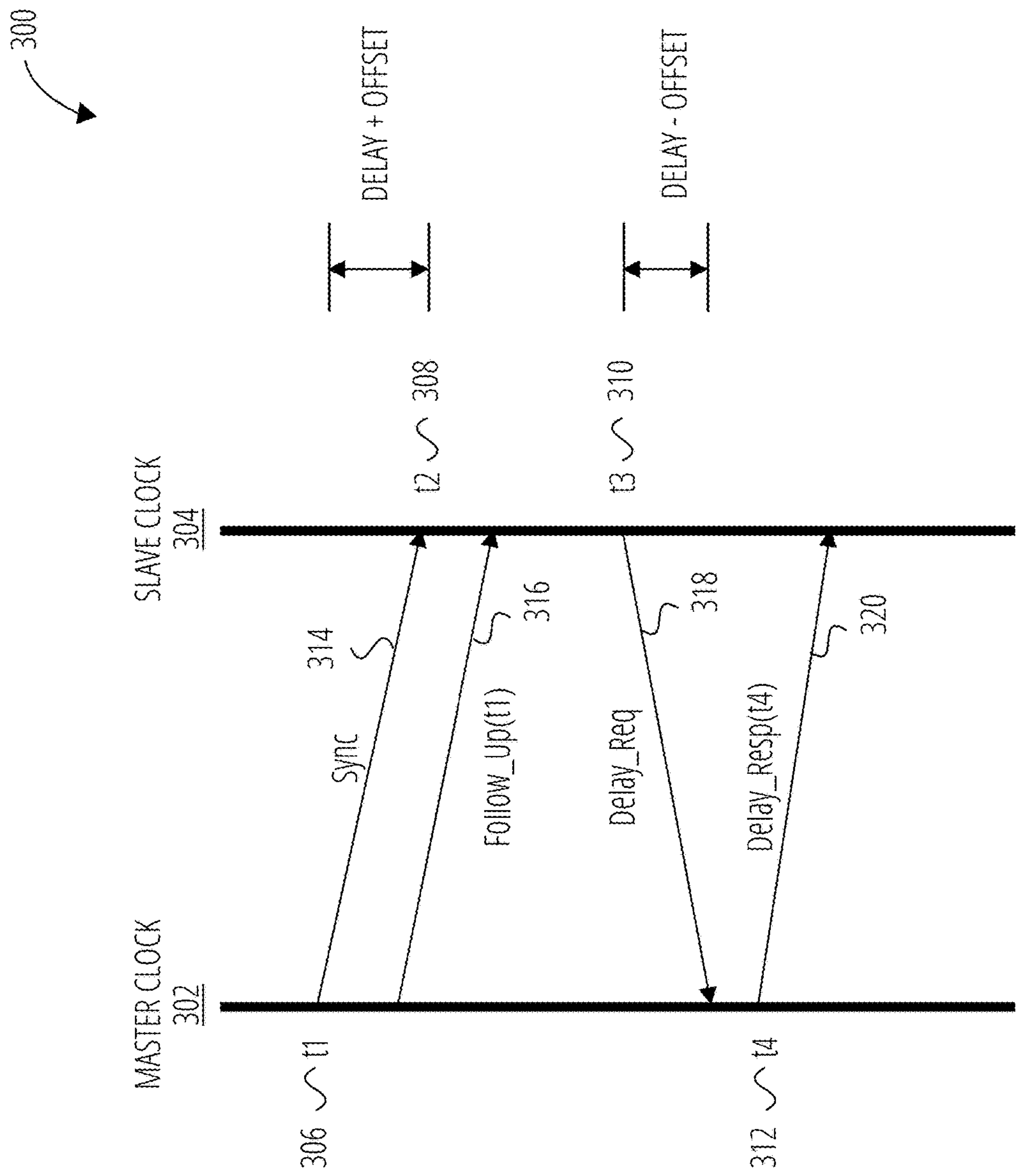
FIG. 3 illustrates a method for synchronizing clocks among devices in a network according to some embodiments of the present disclosure.

Referring now to FIG. 3, FIG. 3 illustrates a method for synchronizing clocks among devices in a network according to some embodiments of the present disclosure. FIG. 3 illustrates a Precision Time Protocol (PTP) of "IEEE Standard for a Precision Clock Synchronization Protocol for Networked Measurement and Control Systems," IEEE Std. 1588-2008 which provides, inter alia, a method 300 of synchronizing a wall time at "secondary" clock 304 distributed among the nodes of a network to a wall time of the network's "primary" clock 302.

According to some embodiments, when operation of a network is initiated, a primary clock 302 may be selected either manually or by a "best primary clock" algorithm. Afterward, messages may be periodically exchanged between a device comprising the primary clock 302 (e.g., the "primary device") and the network devices comprising the secondary clocks 304 (e.g., the "secondary devices") enabling determination of an offset, the time by which a secondary clock leads or lags the primary clock, and the network delay, the time required for data packets to traverse the network.

In some embodiments, at defined intervals (e.g., two second intervals) the primary device may multicasts a Sync message 314 to the other network devices. In some embodiments, the precise primary clock 302 wall time of the Sync message's transmission, t1 306, is determined and included as a timestamp in either the Sync message 314 or in a Follow-Up message 316. In some embodiments, the secondary device determines the local wall time, t2 308, at which the device received the Sync message 314.

In some embodiments, a Delay_Req message 318 may then be sent by the secondary device to the primary device at time, t3 310. In some embodiments, the primary clock's time of receipt, t4 312, of the Delay_Req message 318 is determined and the primary device responds with a Delay_Resp message 320 which includes a timestamp indicating t4 312. In some embodiments, the secondary device may then determine the network delay and the secondary clock's offset from the four times, t1 306, t2 308, t3 310, and t4 312:

$$\text{Delay} + \text{Offset} = t2 - t1 \tag{1}$$

$$\text{Delay} - \text{Offset} = t4 - t3 \tag{2}$$

$$\text{Delay} = ((t2 - t1) + (t4 - t3))/2 \tag{3}$$

$$\text{Offset} = ((t2 - t1) - (t4 - t3))/2 \tag{4}$$

In some embodiments, consecutive measurements of the offset also permit compensation for the secondary clock's frequency drift. In some embodiments, with the time and frequency drift determined, each secondary clock may be adjusted to match the wall time of the primary clock by adding or subtracting the offset to or from the local wall time and adjusting the secondary clock's frequency in order to time-align signals.

As will be noted, IEEE 802.11, "IEEE Standard for Information Technology-Telecommunications and Information Exchange Between Systems Local and Metropolitan Area Networks" provides media access control (MAC) and physical layer (PHY) specifications for implementing wireless local area networks (WLAN) referred to basic service sets (BSS). The devices which are parts of a BSS are identified by a service set identification (SSID) which may be assigned or established by the device which starts the network. In some embodiments, each network device or station includes a local timing synchronization function (TSF) timer. In some embodiments, the device's wall clock may be based on a 1 mega-Hertz (MHz) clock which ticks in microseconds. In some embodiments, during a beacon period, all stations in an independent basic service set (IBSS) may compete to transmit a beacon. In some embodiments, each station may calculate a random delay interval and may set a delay timer scheduling transmission of a beacon when the timer expires. In some embodiments, if a beacon arrives before the delay timer expires, the receiving station may cancel its pending beacon transmission. In some embodiments, the beacon may comprise a beacon frame including a timestamp indicating the TSF timer value (e.g., the wall time) of the station that transmitted the beacon. In some embodiments, upon receiving a beacon, if the timestamp is later than the receiving station's TSF timer, the receiving station may set its TSF timer (e.g., the wall clock), to the value of the timestamp thus synchronizing the TSF timers (e.g., the wall clocks) of the transmitting station and the receiving station.

In some embodiments, PTP and TSF are responsible for synchronizing the wall clocks of all nodes in the respective network to the same wall time but not for synchronizing the sample clocks controlling the processing of the various media transported by the network. In some embodiments, the sample clocks may be recovered from the data stream at each of the network's listeners (e.g., endpoints receiving the data stream) enabling different sample clocks for different media to be transported on the same network.

Figure 4:
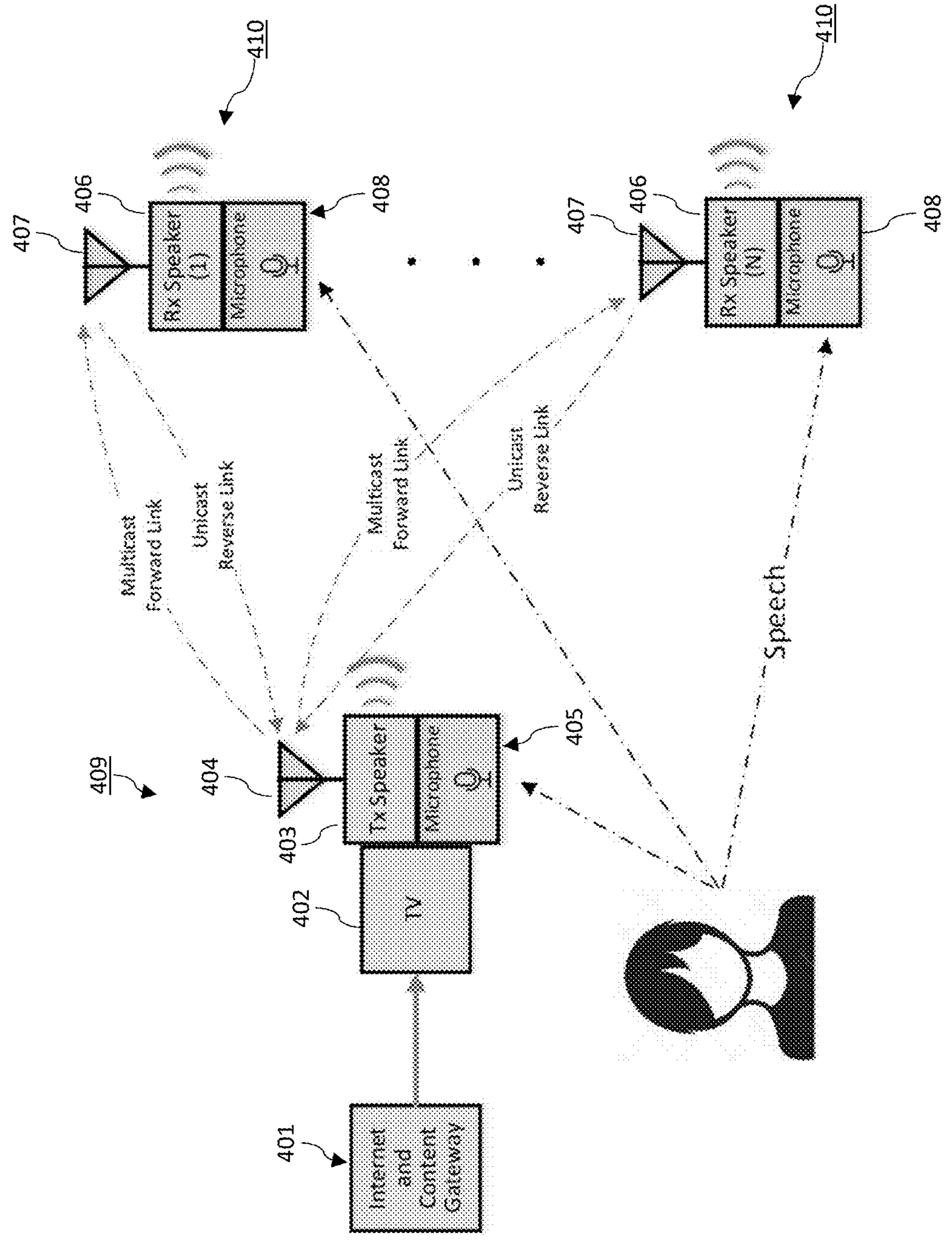
FIG. 4 illustrates a multicast system of networked speakers with respective microphones according to some embodiments of the present disclosure.

Referring now to FIG. 4, FIG. 4 illustrates a multicast system of networked speakers with respective microphones according to some embodiments of the present disclosure.

In some embodiments, a multi-speaker audio systems may have wireless satellite units 410 which contain both speakers 406 and microphones 408. The speakers 406 in the satellite units 410 get their audio via an antenna 407 from a Transmitter device 409 via antenna 404, that is tightly coupled to the television 402 or to the internet and/or content server via the internet and content gateway 401, via a Forward Link and the microphone data is sent from the Receiver satellite unit 410 to the Transmitter device 409 through the Reverse Link. In some configurations the Transmitter speaker 403 function and/or microphone 405 function may be located inside the television 402.

In some embodiments, to enable speech control capability in the speaker network, interference cancellation technology for voice detection; VOICE DETECTION WITH MULTI-CHANNEL INTERFERENCE CANCELLATION, U.S. Pat. No. 11,152,011 was developed, which is incorporated herein by reference in its entirety. This technology is able to distinguish a user's voice from the background interference of all the multichannel speaker's content.

In some embodiments, the system is architected with Multicast transmission from the Transmitter device 409 to all of the N Receiver satellite units 410 and Unicast transmission from all the N Receiver satellite units 410 to the Transmitter device 409. This makes for an efficient packet transmission of all the speaker audio to all the speakers 403 and 406 (e.g., for interference cancellation of the multichannel audio), but it is inefficient to transmit all the microphone data from each satellite unit 410 back to the Transmitter device 409.

In some embodiments, only one microphone's content or one combination of microphones' content can be sent back to the Internet streaming service application. The Internet streaming service application may accepts speech audio input.

In some embodiments, to limit the data flowing on the Reverse Link a trigger function on each satellite unit 410 is activated when the level of the Microphone Audio, processed for interference cancellation, using a template match exceeds a predetermined threshold. Thus, each satellite unit 410 may be configured to determine a degree of match between the Microphone Audio and a predefined audio template, e.g., a template associated with the speech audio input such as at least one voice command of a content provider that provides content via the Internet streaming service application. At this time the Receiver Speaker or Speakers 406 may relay a message back to the Transmitter device 409 that an event has happened and there is at least one voice audio data snippet to process. Typically, an audio snippet may contain audio before the trigger and audio following the end of the message.

In some embodiments, the Transmitter device 409 then can do one of the following:

a. Request the processed Microphone Audio snippet from the Receiver satellite unit 410 with the best match to a predefined audio template for at least one voice command.
b. Request the processed Microphone Audio snippet from several Receiver satellite units 410 that match the template.
c. Request the processed Microphone Audio snippet from all of the N Receiver satellite units 410 during the matching timeframe.

In some embodiments, if the Transmitter device 409 has requested the processed Microphone Audio snippet from the Receiver satellite unit 410 with the best match to the template then no additional processing is required and the Microphone Audio may be sent to the internet streaming application via the internet and content gateway 401.

In some embodiments, if the Transmitter device 409 has requested the processed Microphone Audio snippet from several that match the template or all Receiver satellite units 410, modifies the audio snippets to time-align each audio snippet, and then the audio snippets may be combined. Combining processes that can be used are:

a. Equal Weight Combining
b. Equalize and Equal Weight Combining
c. Maximum-Ratio Combining (MRC)
d. Equalize and Maximum-Ratio Combining (MRC)

In some embodiments, the audio snippets may be modified, e.g., with Equal Weight Combining such that several matching snippets are time aligned and summed using equal weights. This combining assumes that the room response for each microphone is identical or very close, which is unlikely in many rooms because of surface reflections.

In some embodiments, an additional or alternative method for combining may include equalizing the microphone data before summing. This equalization can be done in many ways (as part of general room equalization), but an easy method is to equalize the lesser snippets to the snippet having a greatest degree of match to the template.

In some embodiments, an additional or alternative method for combining may include Maximum-Ratio Combining. Maximum-Ratio Combining considers the Signal to Noise Ratio (SNR) of in the weighting of each snippet before combining.

Figure 5:
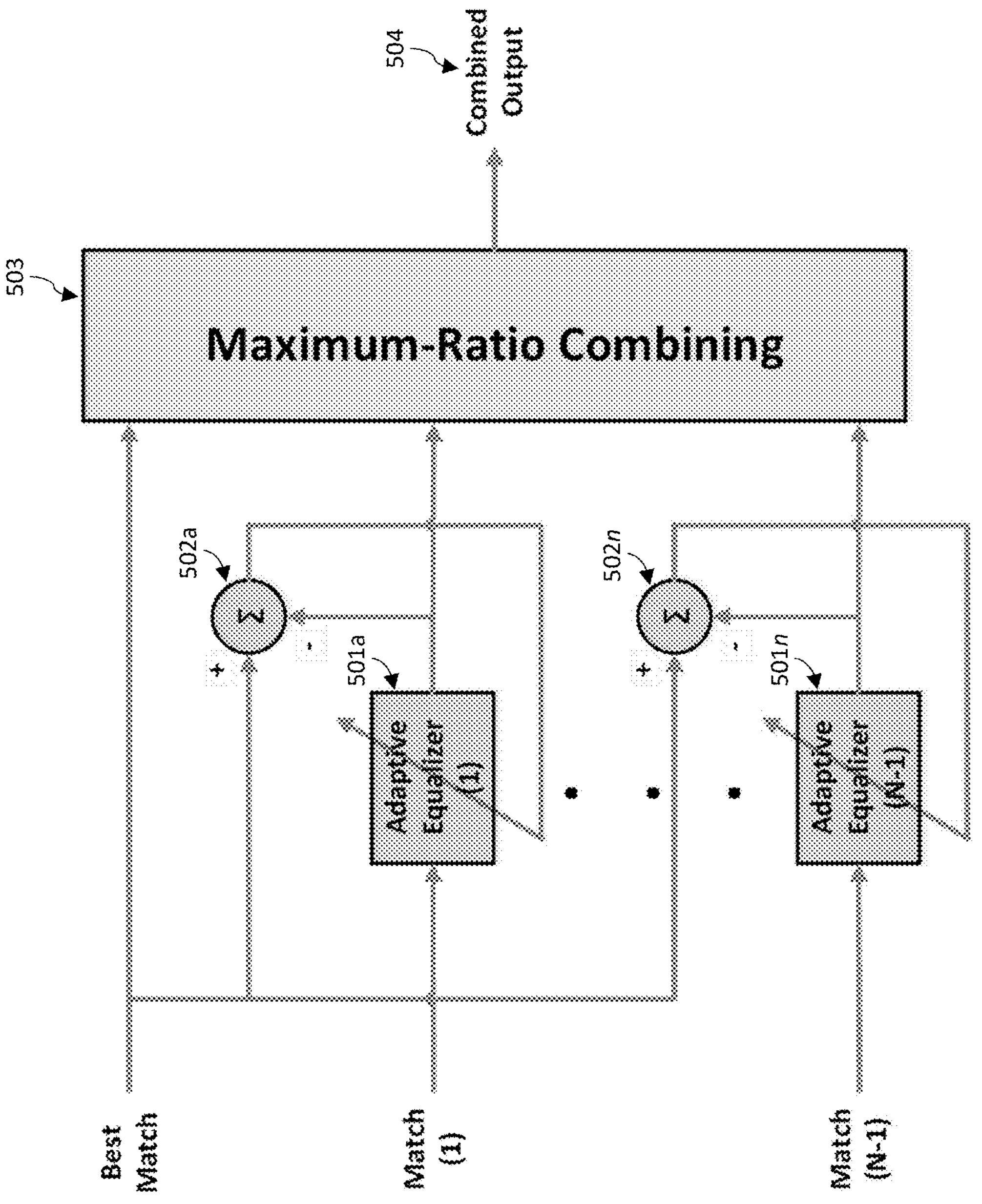
FIG. 5 is illustrates an Maximum-Ratio Combiner for Maximum-Ratio Combining (MRC) voice audio data from the microphones of multiple speakers according to some embodiments of the present disclosure.

Referring now to FIG. 5, FIG. 5 is illustrates a Maximum-Ratio Combiner for Maximum-Ratio Combining (MRC) voice audio data from the microphones of multiple speakers according to some embodiments of the present disclosure.

In some embodiments, Maximum-Ratio Combining (MRC) is a method of combining in which the signals from each channel (Match (1) through Match (N−1)) are added together with the gain of each channel made proportional to the root mean square (RMS) signal level and inversely proportional to the mean square noise level in that channel.

In some embodiments, the MRC may receive each match based on the templates as described above. An adaptive equalizer 501*a* through 501*n* processing each respective match (1) through (N−1) in an order of matches based on a sum 502*a* through 502*n* with each respective previous match in the order of matches. The resulting equalized signals may be provided to an MRC function 503 to produce a combined output 504.

In some embodiments, an Adaptive Equalizer 501*a-n* may be an All-Pass network, in which the spectral amplitude remains the same and only the spectral phase is adjusted. Also, additional filtering may be implemented, with spectral shaping or zeros, to further remove non-voice related interferences.

Each speaker can improve the quality of their Microphone Audio snippet by using multiple microphones on each speaker, and beamforming them to point to the direction of the user. This would add increased cost to each speaker, but this quality may be required for some applications.

Figure 6:
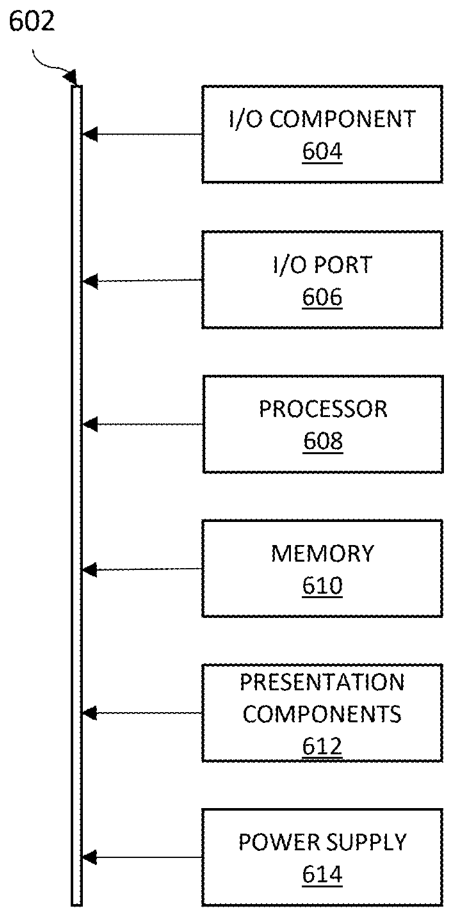
FIG. 6 is a schematic diagram illustrating an example embodiment of a device according to some embodiments of the present disclosure.

Turning now to FIG. 6, FIG. 6 is a schematic diagram illustrating an example embodiment of a device (e.g., a client device, a computing device) that may be used within the present disclosure. In some embodiments, device may be a source 202, a display 204, a TxSpeaker 206, a RxSpeaker 208, a RxSpeaker 210, or a combination thereof as described with respect to FIG. 2. The device is merely an illustrative example of a suitable computing environment and in no way limits the scope of the present disclosure. As used herein, a "device" or "computing device" can include a "workstation," a "server," a "laptop," a "desktop," a "hand-held device," a "mobile device," a "tablet computer," or other computing devices, as would be understood by those of skill in the art. Embodiments of the present disclosure may utilize any number of devices in any number of different ways to implement a single embodiment of the present disclosure. Accordingly, embodiments of the present disclosure are not limited to a single device 600, as would be appreciated by one with skill in the art, nor are they limited to a single type of implementation or configuration of the example device 600.

In some embodiments, device may include a bus 602 that can be coupled to one or more of the following illustrative components, directly or indirectly: input/output (I/O) component 604, I/O port 606, one or more processors 608, one or more memories 610, one or more presentation components 612, and power supply 614. One of skill in the art will appreciate that the bus 602 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices.

In some embodiments, device can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CD-ROM, digital versatile disks (DVD) or other optical or holographic media, and magnetic storage devices that can be used to encode information and can be accessed by the devices 600.

In some embodiments, memory 610 can include computer-storage media in the form of volatile and/or nonvolatile memory. In some embodiments, memory 610 may be removable, non-removable, or any combination thereof. For example, in some embodiments, memory 610 may be a hardware device such as hard drives, solid-state memory, optical-disc drives, and the like.

In some embodiments, device can include one or more processors that read data from components such as the memory 610, the various I/O components 604, etc. In some embodiments, presentation components 612 present data indications to a user or other device. For example, in some embodiments, presentation components 612 may include a display device, speaker, a printing component, a haptic component, etc.

In some embodiments, the I/O ports 606 can enable the device to be logically coupled to other devices, such as I/O components 604. In some embodiments, some of the I/O components 604 can be built into the device 600. In some embodiments, I/O component 604 may be a microphone, joystick, recording device, game pad, satellite dish, scanner, printer, wireless device, networking device, and the like. In some embodiments, I/O port 606 may utilize one or more communication technologies, such as USB, infrared, Bluetooth™, or the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method comprising:

receiving, by a transmitter device, a plurality of voice data signals from a plurality of receiver devices, each of the plurality of receiver devices includes a microphone configured to capture the voice data signals, and the transmitter device determines a degree of match between the plurality of voice data signals to a predefined audio template to a best match;

wherein each voice data signal of the plurality of voice data signals comprises voice data associated with speech;

wherein the voice data of each of the plurality of voice data signals is matched to the predefined audio template to at least a predetermined threshold to reach the best match;

identifying a best match voice data signal based on the best match;

modifying, by the transmitter device, each of the plurality of voice data signals to time-align the plurality of voice data signals;

equalize each of the plurality of voice data signals to the best match voice data signal;

combining, by the transmitter device, the plurality of voice data signals into a single voice data signal based at least in part on at least one combining process; and instructing, by the transmitter device, at least one computer process based at least in part on the predefined audio template.

2. The method of claim 1, wherein the at least one combining process comprises at least one of:

Equal Weight Combining,

Equalize and Equal Weight Combining,

Maximum-Ratio Combining (MRC), or

Equalize and Maximum-Ratio Combining (MRC).

3. The method of claim 1, wherein the predefined audio template is associated with a voice command of a content provider.

4. The method of claim 1, wherein the plurality of receiver devices is configured to determine the degree of match between each voice data signal and the predefined audio template, and transmit, to the transmitter, each voice data signal where the degree of match exceeds a threshold.

5. A system comprising:

a transmitter configured to:

receive a plurality of voice data signals from a plurality of receiver devices, each of the plurality of receiver devices is configured to capture the voice data signals, and the transmitter compares the voice data signals to a predefined audio template to determine a best match;

wherein each voice data signal of the plurality of voice data signals comprises voice data associated with speech;

wherein the voice data of each voice data signal matches the predefined audio template to at least a predetermined threshold;

identify a best match voice data signal based on the best match;

modify each voice data signal to time-align the plurality of voice data signals;

equalize each of the plurality of voice data signals to the best match voice data signal;

combine the plurality of voice data signals into a single voice data signal based at least in part on at least one combining process; and instruct at least one computer process based at least in part on the predefined audio template.

6. The system of claim 5, wherein the at least one combining process comprises at least one of:

Equal Weight Combining,

Equalize and Equal Weight Combining,

Maximum-Ratio Combining (MRC), or

Equalize and Maximum-Ratio Combining (MRC).

7. The system of claim 5, wherein the predefined audio template is associated with a voice command of a content provider.

8. The system of claim 5, wherein the plurality of receiver devices is configured to determine a degree of match between each voice data signal and the predefined audio template, and transmit, to the transmitter, each voice data signal where the degree of match exceeds a threshold.

9. A non-transitory computer readable medium comprising software instructions that, upon execution, are configured to cause a transmitter to:

receive a plurality of voice data signals from a plurality of receiver devices, each of the plurality of receiver devices includes are configured to capture the voice data signals, and to compare the voice data signals to a predefined audio template to determine a degree of match;

wherein each voice data signal of the plurality of voice data signals comprises voice data associated with speech;

wherein the voice data of each voice data signal matches the predefined audio template to at least a predetermined threshold to reach the best match;

identify a best match voice data signal based on the best match;

modify each voice data signal to time-align the plurality of voice data signals;

equalize each of the plurality of voice data signals to the best match voice data signal;

combine the plurality of voice data signals into a single voice data signal based at least in part on at least one combining process; and instruct at least one computer process based at least in part on the predefined audio template.

10. The non-transitory computer readable medium of claim 9, wherein the at least one combining process comprises at least one of:

Equal Weight Combining,

Equalize and Equal Weight Combining,

Maximum-Ratio Combining (MRC), or

Equalize and Maximum-Ratio Combining (MRC).

11. The non-transitory computer readable medium of claim 9, wherein the predefined audio template is associated with a voice command of a content provider.

12. The non-transitory computer readable medium of claim 9, wherein the plurality of receiver devices is configured to determine the degree of match between each voice data signal and the predefined audio template, and transmit, to the transmitter, each voice data signal where the degree of match exceeds a threshold.

* * * * *